Feb. 5, 1935.  A. B. PEFFER  1,989,880
PAN GREASING MACHINE
Filed Oct. 30, 1931  3 Sheets-Sheet 1

INVENTOR
Alrid B Peffer
BY
Synnestvedt & Lechner
ATTORNEYS

Feb. 5, 1935. A. B. PEFFER 1,989,880
PAN GREASING MACHINE
Filed Oct. 30, 1931 3 Sheets-Sheet 2

INVENTOR
Abrid B. Peffer
BY
Synnestvedt + Lechner
ATTORNEYS

Feb. 5, 1935.  A. B. PEFFER  1,989,880
PAN GREASING MACHINE
Filed Oct. 30, 1931  3 Sheets-Sheet 3
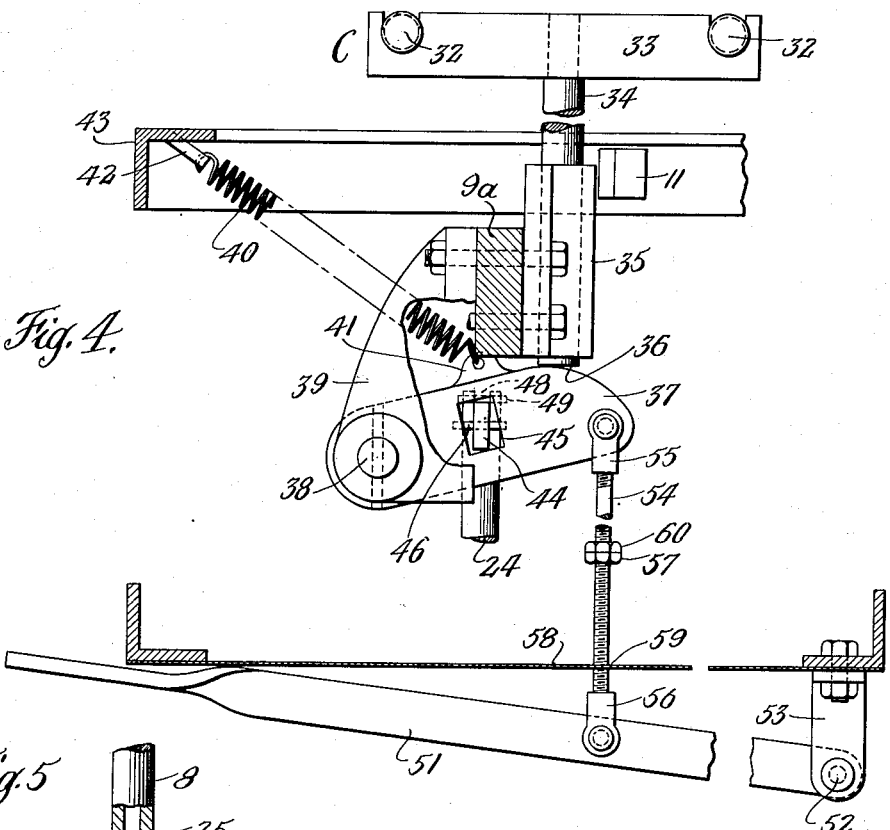
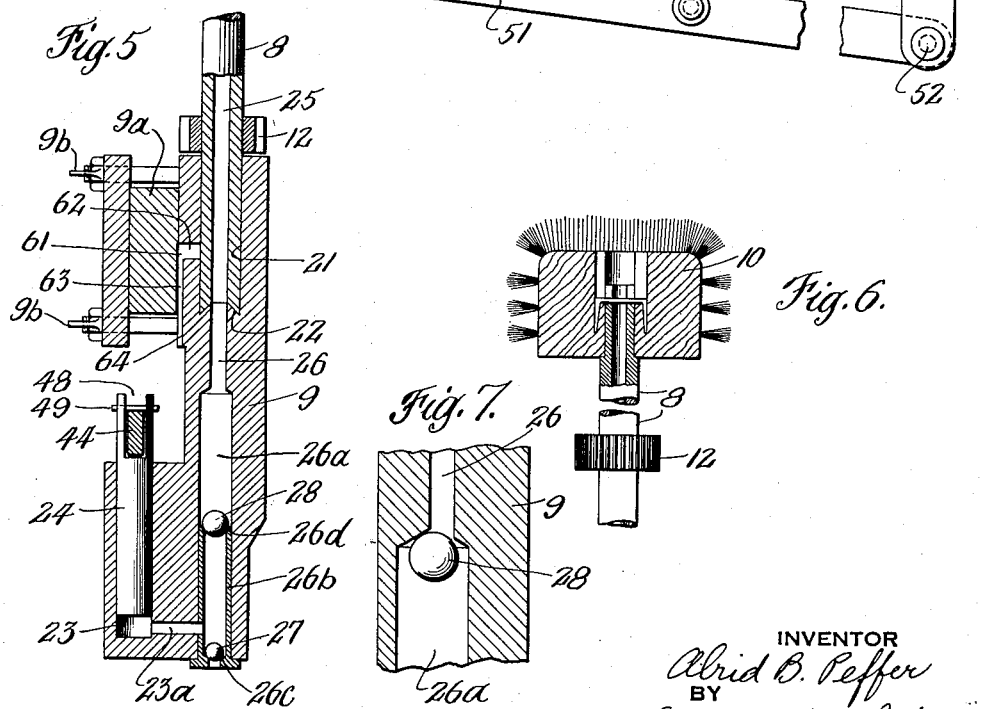

Patented Feb. 5, 1935

1,989,880

UNITED STATES PATENT OFFICE 1,989,880

PAN GREASING MACHINE

Alrid Bertrand Peffer, Philadelphia, Pa., assignor to Imperial Machine Company, Philadelphia, Pa., a partnership composed of Alrid Bertrand Peffer and Emil Schwartz Application October 30, 1931, Serial No. 571,960

9 Claims. (Cl. 91—39)

This invention relates to pan greasing machines such as are now used in bakeries where large numbers of baking pans have to be greased daily.

One of the primary objects of my invention is the provision of simplified and more effective means for supplying grease to the greasing elements of the machine.

Another object of my invention is to provide simplified and more effective means for actuating grease pumps which are associated with the greasing elements.

A further object of my invention resides in the provision of a pan greasing machine in which the supplying of grease to cleaning and greasing elements is under control of the operator in applying the pan to be greased to the machine.

More specifically stated it is an object of my invention to provide means for supplying grease to the greasing elements adapted to be controlled and actuated by the act of applying the pans to be greased to the cleaning elements of the machine.

Another object of my invention is to provide a machine of the character described in which I utilize movement imparted to a movable pan rest to operate grease pumps for supplying grease to the cleaning elements.

A further object of my invention is the provision of a novel valve arrangement for the grease pumps.

A more specific object resides in the provision of a novel grease by-pass arrangement in association with the spindles of the machine.

I also contemplate the provision of a dual control of the grease supplying means in machines of the character described.

Other objects have to do with novel arrangements and constructions of certain parts which enable the machine to be assembled and cleaned expeditiously.

How the foregoing, together with such other objects and advantages as may hereinafter appear or are incident to my invention are realized, is illustrated in preferred form in the accompanying drawings, wherein—

Fig. 4 is an enlarged fragmentary cross sectional view taken on the line 4—4 of Fig. 1;

Fig. 5 is an enlarged fragmentary cross section taken substantially on the line 5—5 of Fig. 1.

Fig. 6 is a fragmentary enlarged cross section through one of the cleaning elements taken on the line 6—6 of Fig. 1, and Fig. 7 is an enlarged fragmentary view of a valve detail.

The machine comprises in general a supporting structure A, in this instance in the form of a reinforced casing 7 mounted on wheels, thus making the machine portable; a plurality of spindles 8, in this instance six being shown mounted in a line in spaced relation; a plurality of supports 9, one for each spindle; and a plurality of cleaning and greasing elements 10 mounted on the spindles 8 for rotation therewith as by means of a pin and slot connection illustrated in Fig. 6.

Figure 1:
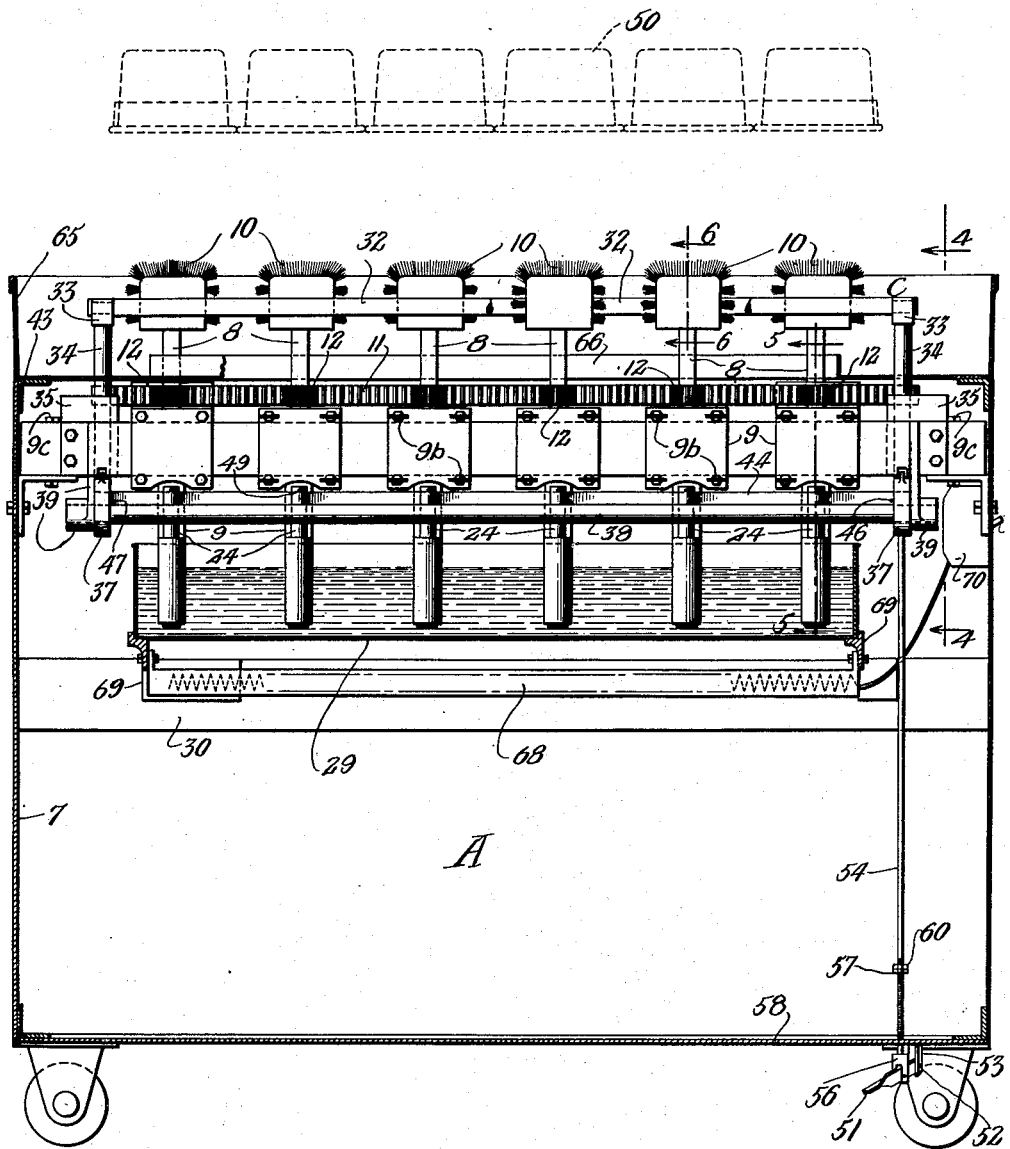
Fig. 1 is a sectional elevational front view of a machine with the enclosing structure and grease container shown in section and with a series of pans to be greased illustrated directly above the machine in dotted lines.
Figure 2:
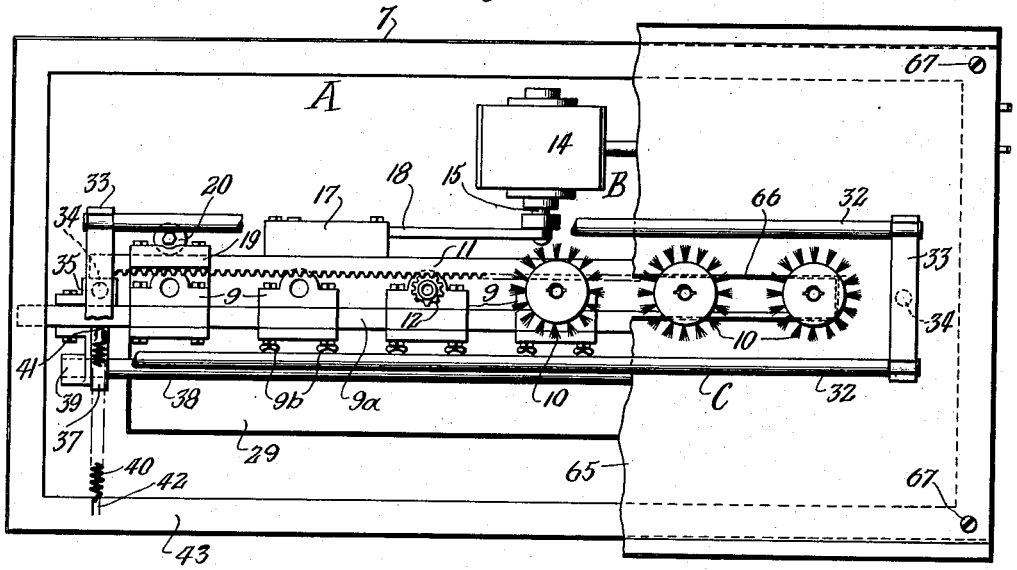
Fig. 2 is a plan view of the machine in which certain of the parts have been broken away in order to more clearly show other parts located therebelow and with certain of the greasing elements removed.
Figure 3:
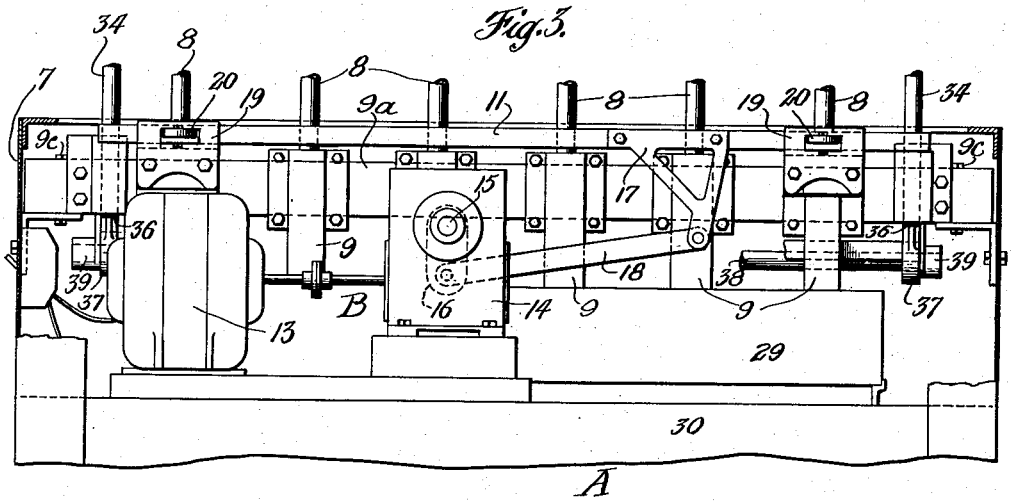
Fig. 3 is a fragmentary sectional elevational view looking at the machine from the rear.

The supports 9 are carried by a fixed bar 9a, and I prefer to rigidly secure one of the end supports, for example, the left-hand one as viewed in Fig. 1, to the bar 9a, and to adjustably secure the remaining supports to the bar. I am enabled, therefore, to properly locate this end spindle and then locate the remaining spindles in their proper spaced relation from it, so that they are readily adjustable for pans of different sizes. The adjustment may be made by means of the wing nuts 9b.

The spindles 8 with their cleaning elements are adapted to be rotated first in one direction and then in the reverse direction by means of a rack bar 11 meshing with pinions or gears 12 which are secured to the spindles. Reciprocatory motion is imparted to the rack bar 11 by means of a driving mechanism indicated as a whole by the reference letter B and comprising a motor 13, a gear reduction device 14 adapted to be driven by the motor and having a driven shaft 15 carrying a crank arm 16. A bracket 17 is secured to the rack bar 11 and a link 18 serves to connect the crank arm 16 to the bracket 17. The rack bar is suitably guided by means of guide blocks 19, which in this instance are secured to the supports 9 of the two end spindles. The rack bar is held against lateral displacement from the pinions 12 by means of anti-friction rollers 20 mounted for rotation in the guide blocks 19.

Referring now particularly to Figs. 1 and 5, it will be seen that each of the supports 9 has a spindle bore 21 providing a conical seat or shoulder 22 on which the spindle rests at its lower end. This arrangement provides an effective seal against leakage of grease without the necessity of employing a special packing. Each support 9 is also provided with a bore 23 adapted to receive a plunger or piston 24, which as will presently appear, operates as a grease pump. The spindles 8 are hollow, thus providing a grease passage 25 through which grease is forced to the greasing elements 10.

The supports 9 are provided with passages the upper portions 26 of which are adapted to register with the lower ends of the passages 25 in the spindles. The lower portions 26a of the passages in the supports 9 are of larger diameter than the upper portions 26 and are offset with respect to the upper portions 26 as shown in Figs. 5 and 7.

Into the lower ends of the portions 26a are fitted suitable bushings or valve cages 26b, there being provided in said cages a lower valve seat 26c and an upper valve seat 26d. A ball check valve 27 is adapted to coact with the lower seat 26c and a second and somewhat larger ball 28 is adapted to coact with the upper seat 26d, the ball 28 being free to ride up and down within the enlarged portion 26a.

The diameter of the ball 28 with respect to the portion 26a and the amount of offset between the portion 26a and the portion 26 are such (see Fig. 7) as to prevent all possibility of the ball 28 ever closing off the passage at the point of offset.

Communication between the bore 23 and the interior of the cage 26b just above the lower check valve 27 is provided for by means of a passage 23a.

A grease container 29 is mounted on suitable supporting structure 30 and the lower end portions of the supports 9 extend thereinto a sufficient distance to be well submerged in the grease in the container.

The pump pistons or plungers 24 are adapted to be reciprocated and when the piston is on its up stroke, the ball valve 27 is lifted from its seat and grease is drawn from the container 29 into the bore or cylinder 23 and the ball valve 28 is drawn to its seat 26d. When the piston 24 moves down, the ball valve 27 is moved against its seat 26c and grease is forced upwardly through the bore of the cage 26b past the other check valve 28 and thence through the portions 26a and 26 to the spindle bore 25 which delivers to the cleaning and greasing element.

The arrangements just described provide for a number of advantages. In the first place, the upper check valve 28 prevents the plunger 24 from withdrawing grease from the passages which deliver to the cleaning elements, so that the channel or passage as a whole is substantially full of grease at all times. In this way I am enabled to positively ensure a delivery of grease to the cleaning elements or brushes whenever the pans are applied and the device is operated. Should the grease at any time become rather stiff or hard the ball valve 28 may rise upwardly in the portion 26a, but the offset between this portion and the portion 26 prevents the ball from ever seating against the portion 26 and closing off the passage. In other words, grease can at all times be forced around the ball and out through the portion 26 to the brushes or cleaning elements, even though the grease might become sufficiently stiff to prevent the ball 28 from always coming back to its seat 26d. It will, of course, be understood that on the discharge stroke of the plunger 24 the valve 27 moves downwardly against the seat 26c.

I should also like to call attention to the fact that in case it becomes necessary to clean out the grease passages it is a very simple matter to remove the spindle 8 and insert a tool through the bores 26 and 26a which can be pushed against the ball 28 in order to force the cage 26b downwardly out of the supporting member 9.

An additional advantage incident to the construction just described resides in the fact that there are no members associated with the ball 28 which would tend to collect lint or other foreign substances in the grease. The ball itself has a highly polished surface and does not tend to collect dirt of this kind. To further guard against such accumulations the passages are carefully machined or reamed in order to present as smooth an interior surface as possible.

The pump piston 24 is reciprocated by means of a pan rest C comprising a pair of parallel bars 32, 32 mounted in end cross bars 33, 33. The cross bars 33 are provided with downwardly extending rods 34 which are slidably mounted in brackets 35, in this instance secured to the fixed bar 9a. The lower ends 36 of the rods 34 engage levers 37 which are secured to a rock shaft 38 adjacent the ends thereof, so as to register with the rods 34. The rock shaft is pivoted in a pair of brackets 39, 39 secured to the fixed bar 9a.

The pan rest C is normally held in an upper position in which the parallel bars 32 thereof are in a horizontal plane cutting the general horizontal plane of the greasing elements 10 by means of springs 40 connected at one end to lugs 41 carried by the levers 37 and at their other end to lugs 42 carried by the framing member 43, it being noted that the lugs 41 act as stops limiting the upward movement of the levers 37 by engaging the fixed bar 9a, and that the pan rest C is gravity held in contact with the levers 37.

A cross bar 44 is loosely carried by the levers 37 in openings 45 therein and is held against longitudinal displacement with respect to the levers by means of pins 46 and 47. The pistons 24 are attached at their upper ends to the bar 44 through the medium of the slot 48 and pin 49.

When the greasing operation is to be performed, the operator grasps a series of pans such as illustrated in dotted lines at 50 in Figure 1, and holds them in position over the greasing elements or brushes 10 with the pans resting on the pan rest C. He then pushes the pans downwardly, which depresses the pan rest and causes the lever 37 to rock downwardly, carrying with them the bar 44. This in turn moves the pistons or plungers 24 downwardly in their cylinders 23 and causes grease to be forced through the passages 23a, 26a, 26 and 25 to the greasing elements which are being rotated by the driving mechanism B. When the pans are lifted away from the brushes, the pan rest, the levers 37, the bar 44, and the pistons 24 move upwardly under the influence of the springs 40, thus causing the pistons to draw a charge of grease from the grease container 29 into the cylinders 23.

It will be seen from the foregoing that I have provided a combined movable pan rest and operator for the pumps whereby the supplying of grease to the greasing elements is under control of the operator in applying the pan to be greased to the machine. Stated in another way, the movement imparted to the movable pan rest is utilized to operate the grease pumps which supply grease to the greasing elements.

In addition to the pan rest control of the grease supply, I also provide a pedal 51 enabling foot operation of the pumps so that dual operation of the pumps is afforded. The foot pedal 51 is pivoted at 52 in a bracket 53 secured to the framing structure of the machine and is connected to one of the levers 37 by means of a link 54. The length of the link 54 may be adjusted by means of screw threaded connections into the yokes 55 and 56. The stroke of the pistons 24 may be adjusted by means of an adjusting nut 57 threaded on the link 54 and adjusted to engage the bottom plate 58 of the machine at 59 when the pedal 51 is fully depressed. The nut 57 may be locked in its adjusted position by means of a lock nut 60. It will thus be seen that any desired stroke may be imparted to the pistons in accordance with the adjustment of the nut 57.

In some instances it may not be desired to employ all of the greasing elements and I have, therefore, mounted the cleaning elements with their spindles in a manner to be readily removed from their supports, it being noted that the cleaning elements are free to be lifted off the spindles and that the spindles are free to be lifted out of the bores 21 in the supports 9. In order to prevent grease from flowing over at the top of the bore 21 when a spindle is removed, I have provided a by-pass 61 in each support (see Fig. 5) comprising a horizontal port 62 opening into the bore 21 at a point well below the top of the bore, and a downwardly extending groove 63 in the rear face 64 of the support. When the support 9 is secured in place on the fixed bar 9a, the groove 63 provides a grease passage between the support and bar leading downwardly from the port 62. It will thus be seen that the grease which is delivered into the bore 21 by the pump passes through the by-pass 61 for return to the grease container 29, and thus prevents overflow of grease at the top of the bore 21. When the spindle is replaced in the bore it serves as a closure for the by-pass.

Various mechanisms, particularly those which have to be cleaned from time to time, are constructed and arranged to be readily removed and reassembled so as to expedite cleaning of the machine. As pointed out above, the cleaning elements and spindles may be removed by merely lifting them out of place, and similarly, the pan rest bars 32 may be lifted out of their sockets in the cross bars 33, and the cross bars 33 with their depending rods 34 may be lifted out of their supports.

The top cover 65 of the casing is made in the form of a pan having a longitudinal flanged slot 66 through which the spindle pass, and is detachably secured in place as by means of screws 67. This cover pan collects any grease which may discharge from the cleaning elements and may be readily detached for cleaning purposes by lifting the pan rest C and the cleaning elements 10 out of place, and removing the screws 67. When the cover pan is removed, ready access may be had to the interior of the machine from the top.

The grease in the grease container may be heated by means of a suitable heating device such as the electric heated element or elements 68, indicated in Figure 1 and located beneath the grease container. The heater elements may be supported from the brackets 69 which support the grease container. A suitable switch 70 is provided to control the heater device.

In connection with the supporting bar or member 9a it is pointed out that the various operating units of the machine are supported therefrom, thus greatly simplifying the device. For example, the greasing units including the greasing elements 10, spindles 8, pumps 24 and their supports 9, the rack 11, the movable pan rest C, and the rock shaft 38 with its lever 37 and cross bar 44, are all carried by the support 9a and this bar is detachably secured to the main supporting structure A by means of bolts 9c. It will thus be seen that the entire mechanism just referred to, including the bar 9a, may be removed from the machine as a single unit.

I claim:—

1. In a pan greasing machine the combination of a greasing element having a hollow spindle, a support for said spindle, a pump bore in said support, a pump piston fitting said bore, a grease passage in said support connecting the pump bore with the hollow spindle, said passage having a portion of one diameter registering with the hollow of the spindle and a portion of larger diameter, the axes of said portions being in parallel offset relation to each other, and a ball check valve in the portion of larger diameter.

2. In a pan greasing machine the combination of a greasing element and means for supplying grease thereto including a grease pump, a grease passage leading from the pump to the greasing element, said passage having a portion of one diameter and an adjacent portion of a larger diameter, the axes of said portions being in parallel offset relation to each other, a grease inlet to said passage, a check valve controlling said inlet, and a ball valve in the portion of larger diameter adapted to close when grease is being drawn into the pump and to open when grease is being delivered by the pump.

3. In a pan greasing machine the combination of a greasing element having a hollow spindle, and means for supplying grease thereto including a grease pump, a grease passage leading from the pump to the hollow spindle, said passage having a portion of one diameter adapted to register with the hollow of the spindle and an adjacent portion of larger diameter than, and in parallel offset relation to said first portion, and a ball valve in said portion of larger diameter, said valve being of a diameter approximating the diameter of said last mentioned portion.

4. In a pan greasing machine the combination of a greasing element having a hollow spindle, and means for supplying grease thereto including a grease pump, a grease passage leading from the pump to the hollow spindle, said passage having a portion adapted to register with the hollow of the spindle and an adjacent portion of larger diameter than, and offset with respect to, said first portion, and a ball valve in said offset portion, said valve being of sufficient diameter to prevent its closing the first mentioned portion of the grease passage.

5. In a pan greasing machine the combination of a greasing element having a hollow spindle, a support for said spindle, a pump for supplying grease to said element, a grease passage leading from the pump to the greasing element, said passage having an upper portion registering with the hollow of the spindle, a lower portion of larger diameter than the upper portion and offset with respect thereto, a valve cage fitting the lower end of said lower portion, said cage having an upper valve seat and a lower valve seat, ball valves for said seats, the valve for the upper seat being of a diameter to freely fit the lower portion of the grease passage but not to close the grease passage at the point of offset.

6. In a pan greasing machine the combination of a greasing element, a spindle having a passage through which grease is passed to the greasing element, pump means for supplying grease to said passage, a support for the spindle having a grease passage establishing communication between the pump means and the spindle passage, and a grease by-pass in said support located to be normally covered by said spindle against passage of grease therethrough and to be uncovered to by-pass grease upon removal of the spindle.

7. In a pan greasing machine the combination of a greasing element, a support having a bore in which the spindle is mounted for ready removal, a grease passage in said spindle, a grease passage in said support registering with the spindle grease passage, means for forcing grease through said passages to the greasing element, and a by-pass in said support located to open into the bore of the support, said by-pass being normally closed against grease flow by the spindle and open to grease flow upon removal of the spindle.

8. In a pan greasing machine the combination of a greasing element, a reciprocating pump for supplying grease thereto, a pan rest movable with respect to the greasing element in reciprocatory motion, and means connecting said pump to said pan rest for operation thereby, the stroke of said pan rest being proportionate to the stroke of the pump whereby the grease supplied to the greasing elements may be governed by the movement imparted to the pan rest.

9. In a pan greasing machine the combination of a greasing element, a reciprocating pump for supplying grease thereto, a pan rest movable with respect to the greasing element in reciprocatory motion, means connecting said pump to said pan rest for operation thereby, the stroke of said pan rest being proportionate to the stroke of the pump whereby the grease supplied to the greasing elements may be governed by the movement imparted to the pan rest, and means for adjusting the stroke of the pan rest and pump.

ALRID B. PEFFER.